(12) United States Patent
Lindahl et al.

(10) Patent No.: US 8,732,180 B2
(45) Date of Patent: May 20, 2014

(54) RECOMMENDING MEDIA ITEMS

(75) Inventors: Aram Lindahl, Menlo Park, CA (US); Wendy Goh, San Jose, CA (US); Allen P. Haughay, Morgan Hill, CA (US); Shawn Ellis, Sunnyvale, CA (US); Benjamin Rottler, San Francisco, CA (US); Policarpo Wood, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 12/617,338

(22) Filed: Nov. 12, 2009

(65) Prior Publication Data

US 2011/0113051 A1  May 12, 2011

(51) Int. Cl.
*G06F 17/30* (2006.01)
(52) U.S. Cl.
USPC .......................................... 707/758; 707/705
(58) Field of Classification Search
USPC .................................. 707/705, 758
See application file for complete search history.

(56) References Cited

U.S. PATENT DOCUMENTS

| | | | |
|---|---|---|---|
| 2005/0038819 A1* | 2/2005 | Hicken et al. | 707/104.1 |
| 2005/0278758 A1 | 12/2005 | Bodlaender | |
| 2006/0026521 A1 | 2/2006 | Hotelling et al. | |
| 2006/0026535 A1 | 2/2006 | Hotelling et al. | |
| 2007/0106672 A1* | 5/2007 | Sighart et al. | 707/10 |
| 2007/0162502 A1 | 7/2007 | Thomas et al. | |
| 2007/0220552 A1* | 9/2007 | Juster et al. | 725/46 |
| 2007/0264982 A1* | 11/2007 | Nguyen et al. | 455/414.1 |
| 2009/0069911 A1 | 3/2009 | Stefik | |
| 2009/0070184 A1* | 3/2009 | Svendsen | 705/10 |
| 2009/0083362 A1 | 3/2009 | Svendsen | |
| 2009/0199697 A1* | 8/2009 | Lehtiniemi et al. | 84/600 |
| 2009/0217804 A1* | 9/2009 | Lu et al. | 84/602 |
| 2009/0228423 A1 | 9/2009 | Hicken et al. | |

OTHER PUBLICATIONS

Article entitled "Apple announces Itunes 8" by Apple, dated Sep. 9, 2008.*

* cited by examiner

*Primary Examiner* — Mahesh Dwivedi
(74) *Attorney, Agent, or Firm* — Schwegman Lundberg & Woessner, P.A.

(57) ABSTRACT

This is directed to recommending media items of a user's media library. In particular, this is directed to transferring a portion of the user's media library to an electronic device so that the user may discover the portion of the media library. The library can recommend particular media items to the user using any suitable approach, including for example based on one or more preference profiles. The user can accept or reject recommended media items as they are played back to further adjust the user's preference profile, and to revise the selection of recommended media items stored on the device.

20 Claims, 9 Drawing Sheets

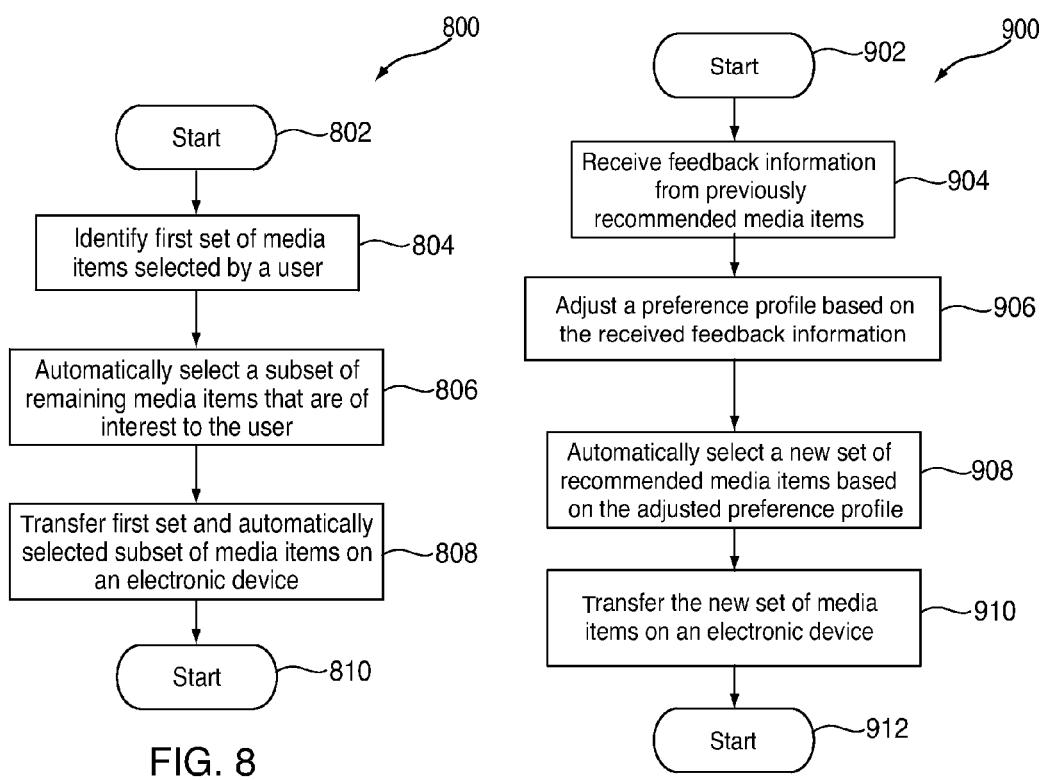

RECOMMENDING MEDIA ITEMS

BACKGROUND

This is directed to providing recommendations of media items to a user of an electronic device. In particular, this is directed to recommending media items that are part of a user's library but that are not locally stored or immediately accessible by an electronic device in use by the device.

Many electronic devices can play back one or more types of media items. For example, an electronic device can play back audio files. As another example, an electronic device can play back video files. The electronic device can access the media files being played back from any suitable source. For example, the media files can be streamed from a remote source (e.g., from a server farm provided by a content provider or from a user's host device). As another example, the media files can be locally stored and accessed for playback. A user can direct the electronic device to play back any suitable media files. In some embodiments, the media files can correspond to freely available media. Alternatively, the media files can correspond to media purchased by the user (e.g., purchased outright or purchased as part of a subscription service). The particular media files accessible to the user or owned by the user can form a user's media library.

In some cases, an electronic device used by the user may have limited local storage. In particular, the local storage may be less than the size of the user's media library, such that the user cannot store the entire library locally on the device. The user may then be forced to select a subset of the library for local storage and local playback. If the electronic device cannot connect to the media library (e.g., the host device storing the media library is not remotely accessible, or the electronic device cannot connect to a communications network), the user of the electronic device may not be able to play every song from the user's library using the electronic device. The user may then be required to select a particular subset of media items of interest to play back using the device.

The user can select the subset of locally stored media items using any suitable approach. In some embodiments, the user can select media items of a particular genre, by a particular artist, in a particular album, or having any other suitable metadata value or combination of metadata values. In other embodiments, the user can define one or more playlists of media items to synch to the electronic device. The playlists can be generated using any suitable approach, including in response to receiving user selections of particular media items, based on one or more seed media items, received from a remote source (e.g., receive recommendations from a friend), or any other suitable approach.

Because these approaches require a user to define the media items locally stored on the device, the user may forget about or rarely hear media items that are not transferred to the electronic device. Depending on the amount of media items that are not locally stored, the user may not be able to discover or re-discover significant portions of the user's media. This may limit the user's ability to enjoy the user's media library and the user's electronic device.

SUMMARY

This is directed to recommending media items from a user's media library to the user of an electronic device. In particular, this is directed to identifying particular media items of the user's media library to automatically transfer to a user's electronic device so that the user can discover or rediscover media from the user's media library.

To assist a user in remembering or rediscovering unselected or forgotten portions of a user's media library, a host device or other device associated with the media library can automatically select media items to store on the electronic device as media library recommendations. The electronic device can include any suitable number of recommended media items, including for example a dedicated amount of storage (e.g., automatically selected or pre-defined by the user). The recommended media items can include full media items, media items stored using a lossy encoding to reduce the storage required per media item, or clips extracted from the media items.

The host device or media library can determine which media items to recommend to a user using any suitable approach. In some embodiments, the host device can generate or retrieve a user preference profile characterizing the type of media that the user likes. The host device can then compare the unselected media items to the preference profile, and select the media items that match or satisfy criteria of the preference profile. The preference profile can be updated to reflect the user's most recent tastes, including for example based on recently purchased or added media items, play counts, and user-defined star ratings.

As a media item is played back using the electronic device, the user can provide an indication of approval (e.g., thumbs up) or disproval (e.g., thumbs down). Based on the received indication, the electronic device can mark the media items. The approved media items can be retained on the electronic device, and more media items similar to the approved media items can be recommended to the user. The rejected media items can be removed from the electronic device, and other media items similar to the rejected media items can also be removed or not recommended to the user.

As new media items are recommended to the user and previously recommended media items are retained by the device (e.g., and become user selected media items), the electronic device can manage the media items stored such that the amount or number of recommended media items remains constant. In particular, the electronic device can remove user selected media items from storage based on the user's most recent approval and disproval information for recommended media items.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 8 is a flowchart of an illustrative process for automatically transferring recommended items of a user's media library to an electronic device in accordance with one embodiment of the invention;

FIG. 9 is a flowchart of an illustrative process for selecting media items to recommend in accordance with one embodiment of the invention.

DETAILED DESCRIPTION

Figure 1:
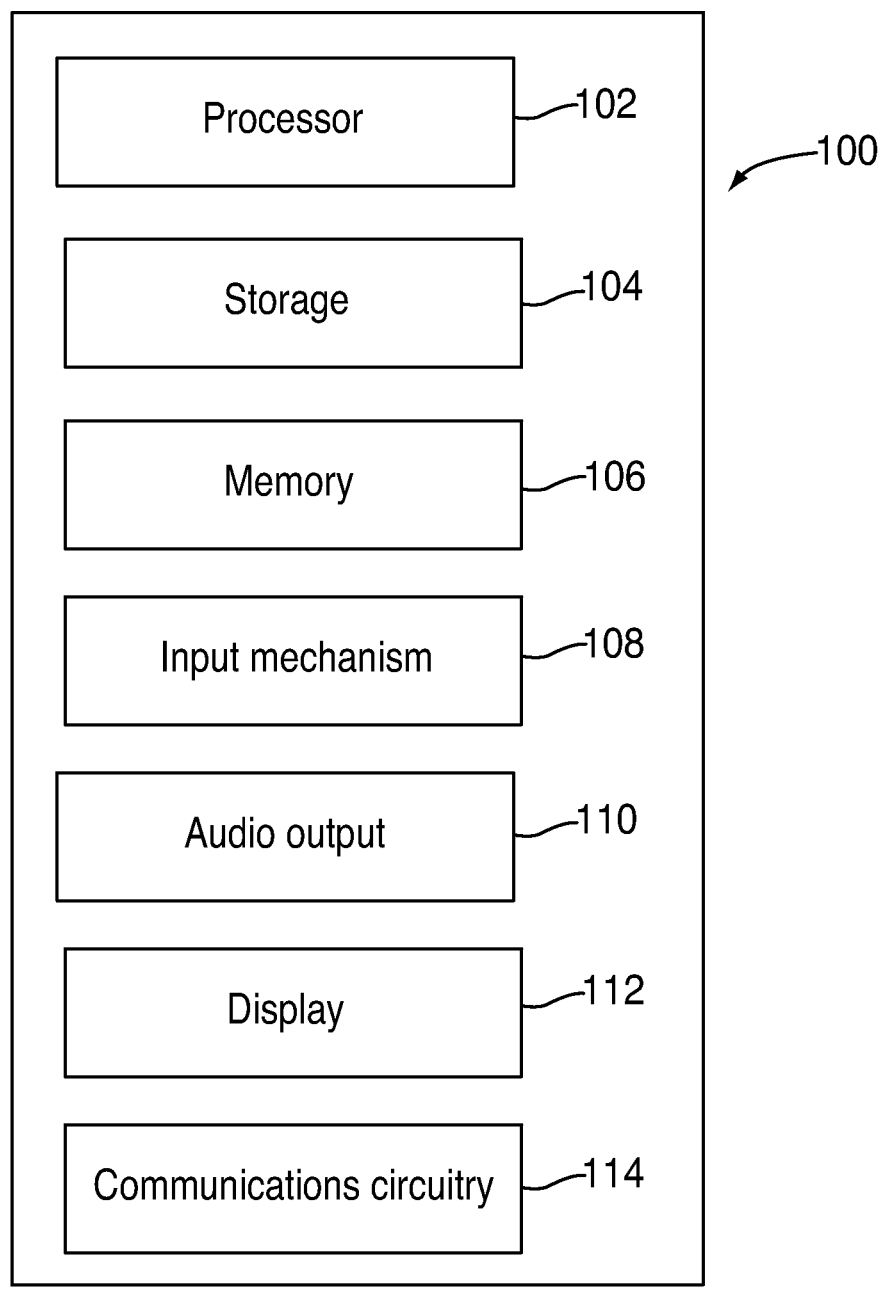
FIG. 1 is a schematic view of an electronic device in accordance with one embodiment of the invention.

A host device is operative to recommend media items from a user's library to a user for storage on a user's portable electronic device.

A user may own or have access to a large library of media content. For example, the user can own a large library of music, movies, television series, podcasts, and audio books. The user can play back the media of the library using any suitable electronic device, including for example one or more devices on which some or all of the media library is stored. For example, the electronic device can store an entire media library. As another example, the electronic device can include a portable electronic device on which only a portion of the media library is stored. As still another example, the electronic device can receive a stream of individual media items of the library from a remote source (e.g., stream from a cloud).

In some cases, the electronic device used by the user may not be able to stream or download media items remotely from the media library (e.g., no communications circuitry, or no available communications network), or the electronic device may have insufficient storage for storing the entirety of the media library. The user may then be forced to select a subset of the media items from the library for local storage on the device. The media items of the subset may then be the only media items that the user can play back using the device.

Because of the limited storage resources of the device and the vast number of media items stored in the user's library, a user may forget about or not be able to discover portions of the user's media library that are not locally stored by the device. This may reduce the user's ability to enjoy the user's media and to discover the user's library. To assist the user in discovering the media items available from the user's media library, the electronic device can store one or more recommended media items from the user's library that are not selected by the user for storage on the electronic device. For example, a particular amount of the electronic device storage (e.g., 20%) can be allocated to storing media library-selected media items recommended to the user.

The recommended media items can include any suitable media items from the media library. For example, the recommended media items can include partial or entire media items (e.g., 30 second previews). As the recommended media items are played back, the user can provide an indication of whether or not the user likes the recommended media item. For example, the user can provide a rating, or select a "thumbs up" or "thumbs down" option. In response to receiving the user's indication, the media library can determine whether or not to include the entire recommended media item in storage on the electronic device. In some embodiments, the media library can instead or in addition include several media items (e.g., a set of related media items) for storage by the electronic device.

The media library can determine which media items to recommend using any suitable approach. In some embodiments, a preference profile can be generated for the user. The preference profile can detail particular media attributes that are of interest to the user. In some embodiments, the preference profile can include listings of playlists or media items that are of interest to the user. The particular media items or media attributes of interest to the user can be automatically determined, for example from play counts, purchases, user ratings, or any other play back or other interactions of the user with the media items of the user's media library.

FIG. 1 is a schematic view of a electronic device in accordance with one embodiment of the invention. Electronic device 100 may include processor 102, storage 104, memory 106, input interface 108, audio output 110, display 112, and communications circuitry 114. In some embodiments, one or more of electronic device components 100 may be combined or omitted (e.g., combine storage 104 and memory 106, or omit communications circuitry 114). In some embodiments, electronic device 100 may include other components not combined or included in those shown in FIG. 1 (e.g., a power supply or a bus), or several instances of the components shown in FIG. 1. For the sake of simplicity, only one of each of the components is shown in FIG. 1.

Processor 102 may include any processing circuitry operative to control the operations and performance of electronic device 100. For example, processor 102 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input interface 108 may provide inputs to input/output circuitry of the electronic device. Input interface 108 may include any suitable input interface, such as for example, a button, keypad, dial, a click wheel, or a touch screen. In some embodiments, electronic device 100 may include a capacitive sensing mechanism, or a multi-touch capacitive sensing mechanism. Some sensing mechanisms are described in commonly owned U.S. patent application Publication No. 2006/0026521, published on Feb. 2, 2006, entitled "Gestures for Touch Sensitive Input Devices," and U.S. patent application Publication No. 2006/0026535published on Feb. 2, 2006, entitled "Mode-Based Graphical User Interfaces for Touch Sensitive Input Device," both of which are incorporated herein in their entirety.

Audio output 110 may include one or more speakers (e.g., mono or stereo speakers) built into electronic device 100, or an audio connector (e.g., an audio jack or an appropriate Bluetooth connection) operative to be coupled to an audio output mechanism. For example, audio output 110 may be operative to provide audio data using a wired or wireless connection to a headset, headphones or earbuds.

Display 112 may include display circuitry (e.g., a screen or projection system) for providing a display visible to the user. For example, display 112 may include a screen (e.g., an LCD screen) that is incorporated in electronic device 100. As another example, display 112 may include a movable display or a projecting system for providing a display of content on a surface remote from electronic device 100 (e.g., a video projector). In some embodiments, display 112 can include a coder/decoder (Codec) to convert digital media data into analog signals. For example, display 112 (or other appropriate circuitry within electronic device 100) may include video Codecs, audio Codecs, or any other suitable type of Codec.

Display 112 also can include display driver circuitry, circuitry for driving display drivers, or both. Display 112 may be operative to display content (e.g., media playback information, application screens for applications implemented on the electronic device, information regarding ongoing communications operations, information regarding incoming communications requests, or device operation screens) under the direction of processor 102.

One or more of input interface 108, audio output 110 and display 112 may be coupled to input/output circuitry (not shown). The input/output circuitry may be operative to convert (and encode/decode, if necessary) analog signals and other signals into digital data. In some embodiments, the input/output circuitry can also convert digital data into any other type of signal, and vice-versa. For example, the input/output circuitry may receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, or any other component of electronic device 100. In some embodiments, several instances of the input/output circuitry can be included in electronic device 100.

Communications circuitry 114 may be operative to communicate with other devices or with one or more servers using any suitable communications protocol. Electronic device 100 may include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VoIP), any other communications protocol, or any combination thereof. In some embodiments, communications circuitry 114 may include one or more communications ports operative to provide a wired communications link between electronic device 100 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 100 may include a bus operative to provide a data transfer path for transferring data to, from, or between control processor 102, storage 104, memory 106, input interface 108, audio output 110, display 112, communications circuitry 114, and any other component included in the electronic device.

Figure 2:
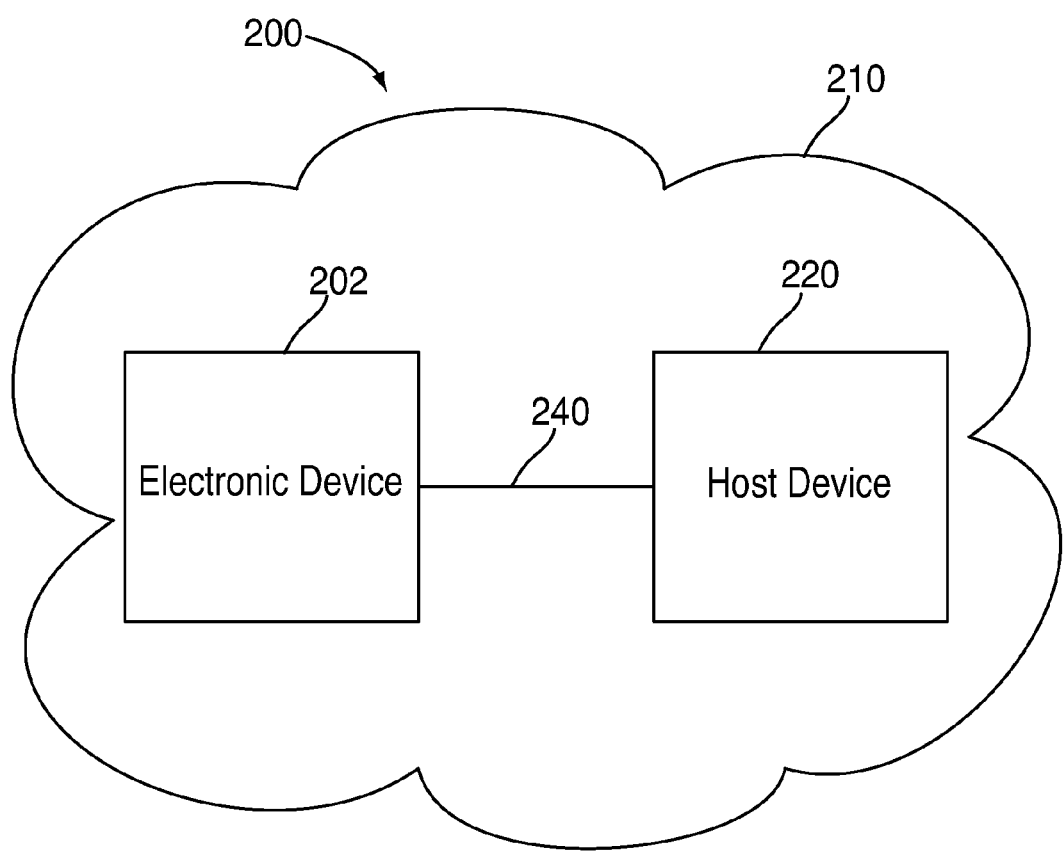
FIG. 2 is a schematic view of an illustrative communications system including an electronic device and a host device in accordance with one embodiment of the invention.

The electronic device can store some or all of a user's media library. For example, the entirety of the user's media library can be located in storage 104. Alternatively, the user's media library can be hosted by another device, and particular media items of the user's library synched to the electronic device. FIG. 2 is a schematic view of an illustrative communications system including an electronic device and a host device in accordance with one embodiment of the invention. Communications system 200 may include electronic device 202 and communications network 210, which electronic device 202 may use to perform wired or wireless communications with other devices within communications network 210. For example, electronic device 202 may perform communications operations with host device 220 over communications network 210. Although communications system 200 may include several electronic devices 202 and host devices 220, only one of each is shown in FIG. 2 to avoid overcomplicating the drawing.

Any suitable circuitry, device, system or combination of these (e.g., a wireless communications infrastructure including communications towers and telecommunications servers) operative to create a communications network may be used to create communications network 210. Communications network 210 may be capable of providing wireless communications using any suitable short-range or long-range communications protocol. In some embodiments, communications network 210 may support, for example, Wi-Fi (e.g., a 802.11 protocol), Bluetooth (registered trademark), radio frequency systems (e.g., 200 MHz, 2.4 GHz, and 5.6 GHz communication systems), infrared, protocols used by wireless and cellular phones and personal email devices, or any other protocol supporting wireless communications between electronic device 202 and host device 220. Communications network 210 may instead or in addition be capable of providing wired communications between electronic device 202 and host device 220, for example using any suitable port on one or both of the devices (e.g., 30-pin, USB, FireWire, Serial, or Ethernet).

Electronic device 202 may include any suitable device for receiving media or data. For example, electronic device 202 may include one or more features of electronic device 100 (FIG. 1). Electronic device 202 may be coupled with host device 220 over communications link 240 using any suitable approach. For example, electronic device 202 may use any suitable wireless communications protocol to connect to host device 220 over communications link 240. As another example, communications link 240 may be a wired link that is coupled to both electronic device 202 and media provider 220 (e.g., an Ethernet cable). As still another example, communications link 240 may include a combination of wired and wireless links (e.g., an accessory device for wirelessly communicating with host device 220 may be coupled to electronic device 202). In some embodiments, any suitable connector, dongle or docking station may be used to couple electronic device 202 and host device 220 as part of communications link 240.

Host device 220 may include any suitable type of device operative to host a media library and provide media files to electronic device 202. For example, host device 220 may include a computer (e.g., a desktop or laptop computer), a server (e.g., a server available over the Internet or using a dedicated communications link), a kiosk, or any other suitable device. Host device 220 may transfer media files of a media library to an electronic device using any suitable approach.

In some embodiments, the host device can run an application dedicated to providing a communications interface between the host device and the electronic device (e.g., iTunes, available from Apple Inc.). Using the application, a user can define the particular subset of media items from the user's media library to transfer to the electronic device.

Figure 3:
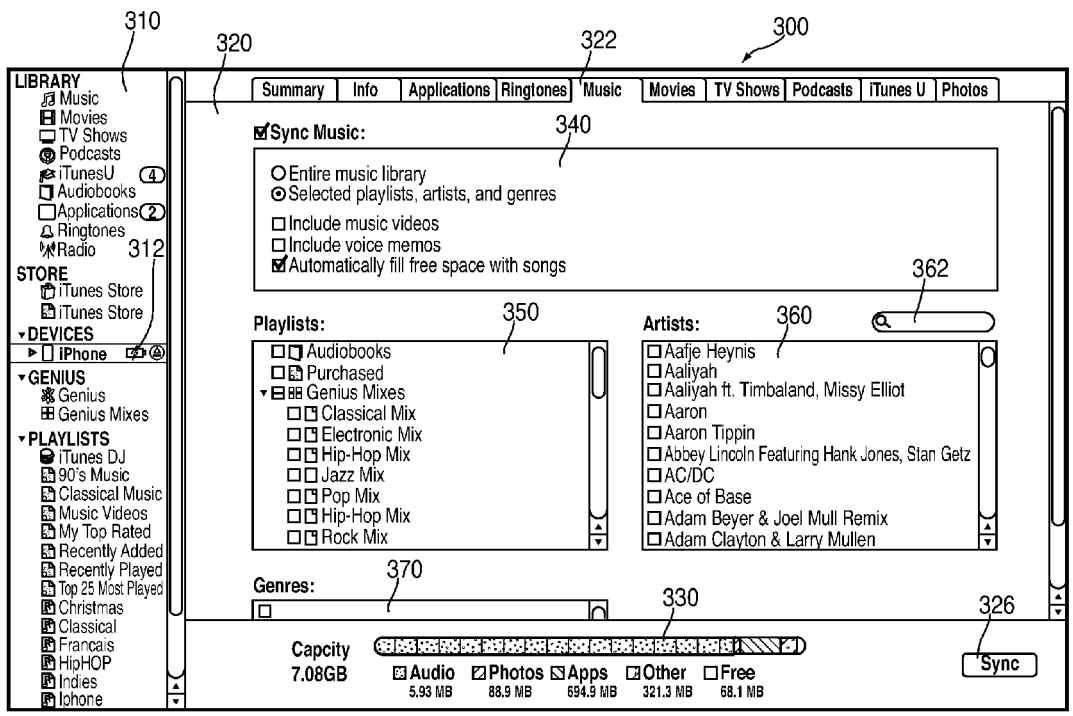
FIG. 3 is a schematic view of an illustrative display for identifying media items to transfer to an electronic device in accordance with one embodiment of the invention.

In some embodiments, the electronic device may have limited storage relative to the host device, such that only the host device has sufficient storage to store the user's entire music library. In such cases, a user may be required to select only a subset of the user's media library for local storage on the electronic device. The user can select particular media items to store locally using any suitable approach. In some embodiments, the user can select the particular media items of the user's media library using a dedicated application operating on the host device. FIG. 3 is a schematic view of an illustrative display for identifying media items to transfer to an electronic device in accordance with one embodiment of the invention. Display 300 can include side bar 310 identifying different types of media and devices available to the user's media library. For example, side bar 310 can include options for music, movies, TV shows, audiobooks, radio, or any other type of media. Side bar 310 can instead or in addition including listings identifying electronic devices that are connected to the host device library (e.g., iPhone 312), as well as collections of media items (e.g., collections defined based on one or more seeds or user-defined collections). The user can select any of the options in side bar 310 to direct display 300 to provide corresponding content or information in region 320.

Region 320 can include a series of options related to the particular option selected in side bar 310. For example, in response to receiving a user selection of a "music" option, region 320 can include a listing of available music in the user's media library. In response to a user selection of a device (e.g., iPhone 312), display 300 can include options relating to the content stored on the device, or to the content that a user wishes to store on the device. Region 320 can include tabs 322 defining different types of content that a user can store on the device. Such content can include, for example, applications, music, videos, podcasts, photos, personal information (e.g., calendar, mail and contact information), or any other type of content. Because a user's library can include more media than can be stored on the device (e.g., as indicated by device capacity bar 330), the user may be forced to select a subset of the user's available media items to store locally on the device (e.g., items to be transferred from the library to the electronic device). As shown in region 320, the host device can provide a series of selectable options for defining the particular media items to transfer to the electronic device (e.g., using "Sync" option 326).

Display 300 can provide any suitable option for allowing the user to select a subset of the user's media library. For example, display 300 can include general option 340, playlist option 350, and artist options 360. General option 340 can include one or more options generally defining the manner in which media items are selected for inclusion on the electronic device. For example, option 340 can include a radio button for selecting whether some or all of the user's library is to be synched to the electronic device. Option 340 can instead or in addition include specific options regarding the types of media to transfer to the electronic device (e.g., music videos and voice memos). In some embodiments, option 340 can allow a user to set how much of the electronic device storage is allocated to media items.

Using playlist option 350, a user can select particular playlists to transfer to the electronic device. Option 350 can include a listing of playlists generated by the host device application or by the user. The playlists can include any suitable media items, including for example subsets media items selected because of common properties. The user can review or revise the media items in each playlist using any suitable approach, including for example by selecting the option in side bar 310 corresponding to the playlist. In some embodiments, a user can use artists option 360 to select specific artists whose content to provide to the electronic device. To assist a user in quickly finding a particular artist in a large listing, option 360 can be associated with search field 362. Although display 300 only shows options for playlists and artists, it will be understood that the display can include options for identifying media items to transfer to the electronic device storage using any other characteristic attribute of media items. In particular, any metadata associated with media items can be used to display a corresponding option in display 300 (e.g., options based on genre, album, year, play count, ratings, or date added). For example, display 300 can include genre option 370 (for which only the title is shown).

If the user does not regularly go back to display 300 to actually change either content of the playlists that are synched to the electronic device, or the particular playlists or artists selected for the electronic device, there may be media items of the library to which the user never or rarely listens. In particular, the user may forget portions of the media library, and need to rediscover the media items.

Figure 4:
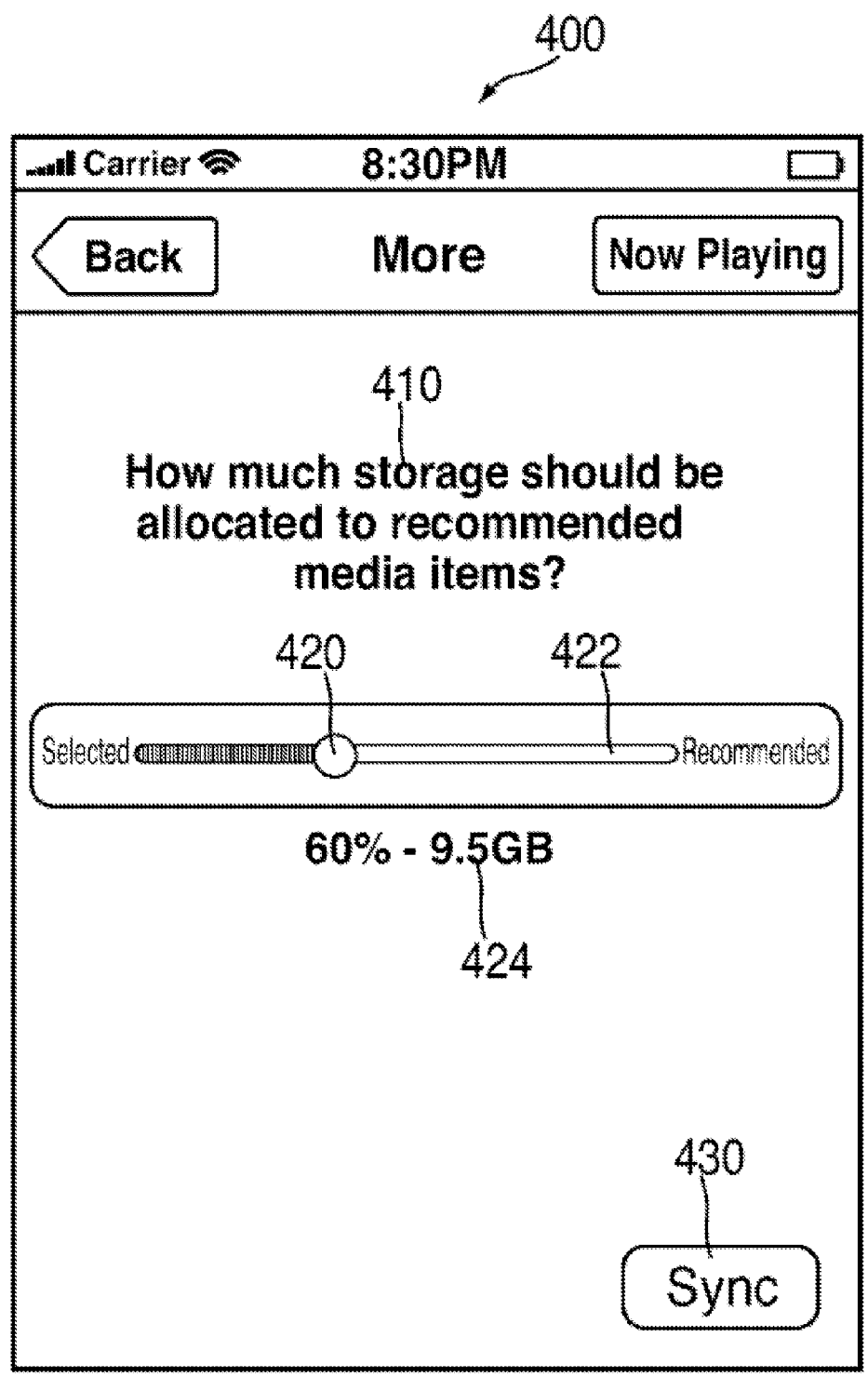
FIG. 4 is a schematic view of an illustrative electronic device display for specifying an amount of storage to allocate to recommended media in accordance with one embodiment of the invention.

To assist a user in rediscovering media items in the user's media library using the electronic device, the user can define, either on the electronic device directly or via the application running on the host device, a portion of electronic device storage dedicated to media items recommended by the media library. FIG. 4 is a schematic view of an illustrative electronic device display for specifying an amount of storage to allocate to recommended media in accordance with one embodiment of the invention. Although display 400 is shown as being an electronic device display, it will be understood that a counterpart display can be provided by the host device application (e.g., as part of display 300, FIG. 3). Display 400 can be accessed from any suitable electronic device display, including for example from a settings display or a media playback display. Display 400 can include region 410 directing the user to select how much of the device storage to allocate to recommended media items. For example, display 400 can include slider 420 that a user can slide across bar 422. Display 400 can also include numerical display 424 indicating the percentage or amount of storage corresponding to the slider position. Once the user has selected the particular amount of storage to allocate to recommended media items, the user can select sync option 430 to direct the host device to provide the corresponding amount of recommended media items.

The media library, host device, or both can determine which media items to recommend to the user, and therefore which media items to transfer to the electronic device using any suitable approach. In some embodiments, the host device, electronic device, or both can generate a preference profile identifying the types of media items or characteristics of media items that are of interest to the user. The preference profile can be generated using any suitable approach. In some embodiments, one or more devices can prompt the user to respond to a series of questions defining the user's interests (e.g., the device playing back media items, or a device on which the library is stored). Alternatively or in addition, one or more devices can monitor the media items consumed by the user, and determine the user's interests from the consumed media items.

In some embodiments, a device (e.g., the device storing the media library) can review the user's media library and identify media items based on play count, rating, date of addition or purchase, rented or purchased items, media items browsed in a store, or any other characteristic that indicates that the user may be interested in a media item. Alternatively or in addition, the electronic device can identify media items of the media library that the user does not like (e.g., skipped media items). The electronic device can determine one or more characteristics that are common to some or all of the identified media items to define the preference profile. The preference profile can include any suitable type of data, including for example metadata for media items of interest to the user, musical attributes of media items of interest (e.g., specific chord progressions, rhythm syncopation, key tonality, vocal harmonies, and instruments), specific artists, specific songs, or any other type of data defining a user's preferences. The preference profile can be stored in any suitable location, including for example on a particular device (e.g., the host device) or in a remote location (e.g., a cloud) such that the profile can be remotely accessed from any electronic device. In particular, the host device, operating the application used to provide media from the user's media library to the electronic device, can access the cloud to determine from the user's preference profile which media items to recommend to the user. In some embodiments, the preference profile can instead or in addition be incorporated as part of the user's media library or as part of an application used to transfer media items from the library to an electronic device.

Using the preference profile, the media library, a host device storing the media library, or any other device can recommend media items to a user.

In the following discussion, it will be understood that any of these can perform the operations required for recommending media items. The host device can identify the media items of the media library that the user has not selected be added to the electronic device, and select recommended media items from the identified unselected media items. For example, the host device can compare characteristics of the identified media items with the preference profile, and select identified media items that match a minimum number of characteristics related to the preference profile. In particular, the host device can select identified media items that share at least a threshold number of characteristics with the preference profile, or that do not include more than a threshold number of characteristics of disliked media items of the preference profile. In some embodiments, some of the identified media items may have nothing in common with the user preference profile (e.g., items that the host device does not know whether the user likes or dislikes). The host device can, in some embodiments, select or recommend these unrelated media items as a new genre or type of media for the user to discover.

In some embodiments, the media library can include information associating related or similar media items. For example, the media library can include one or more collections of media items defined from one or more seed items. If a user indicates that a particular media item is of interest, the host device can use the particular media item as a seed for generating a new playlist or collection of related media items, and recommend media items of the collection. In some embodiments, the host device can define collections or buckets of related media items. The host device can recommend one or more items from a particular media bucket (but less than the entirety of the bucket) and transfer the entire media bucket upon receiving an indication that the user accepts the recommendation of the one or more items from the bucket.

Using the electronic device, a user can play back media transferred from the host device to the electronic device. The user can select the manner in which the media items stored on the electronic device are played back by selecting corresponding options of the device. For example, the user can select particular media items based on artist, album, or playlist. As another example, the user can select media items based on genre, composer, release date, or rating. In some embodiments, a user can select to play back one or both of user-selected media items or media items recommended by the host device. For example, the electronic device can include a virtual playlist that includes only recommended media items. When the user wishes to rediscover media from the media library, the user can select the virtual recommended media playlist.

Figure 5:
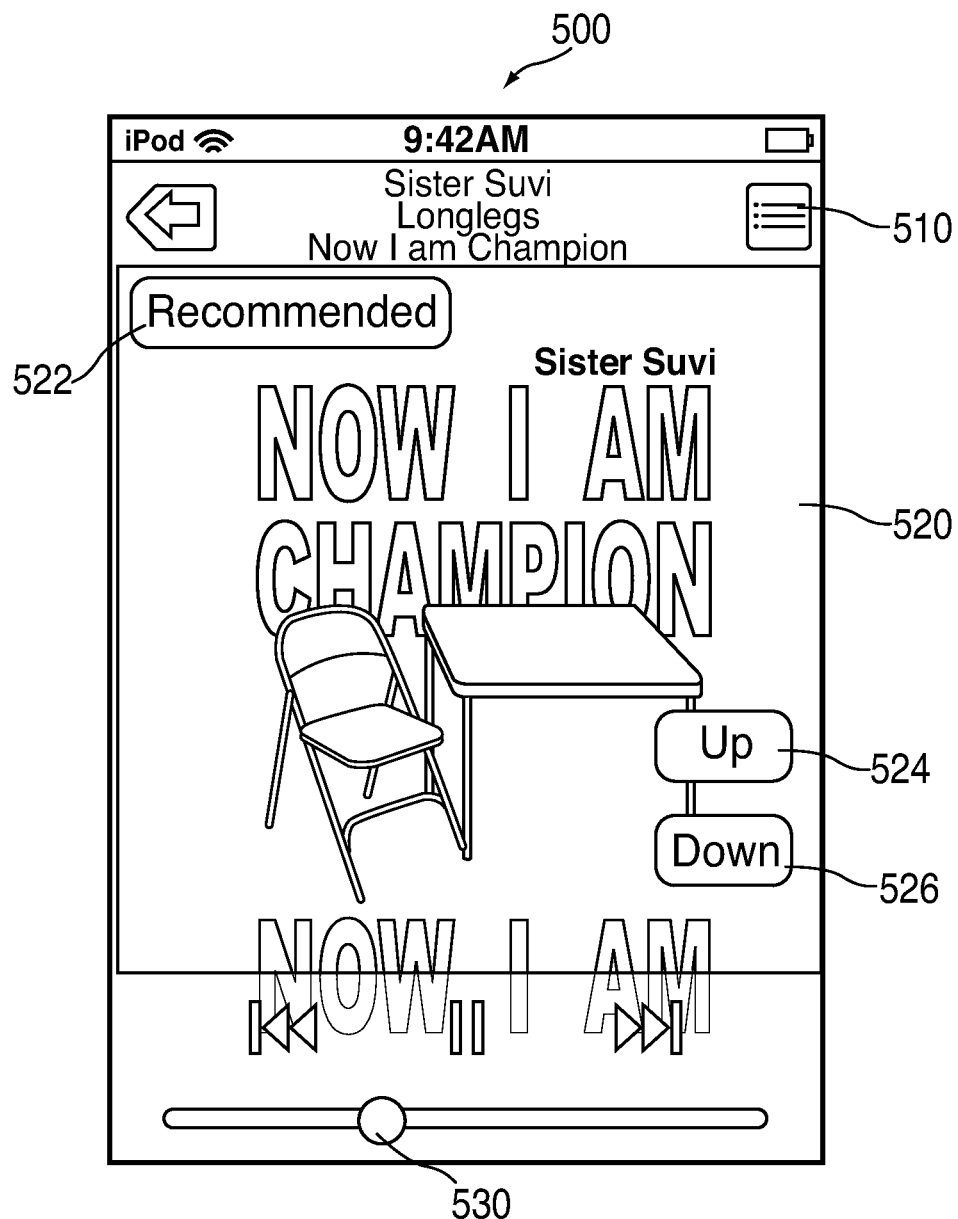
FIG. 5 is a schematic view of an illustrative now-playing display in accordance with one embodiment of the invention.

During media playback, the electronic device can identify a played back media item as a user-selected media item or as a device-recommended media item in a now-playing display. FIG. 5 is a schematic view of an illustrative now-playing display in accordance with one embodiment of the invention. Display 500 can include identification bar 510 and graphic 520. Identification bar 510 can specify the artist, title and album of a currently played back media item, while graphic 520 can include album art associated with the media item. Playback controls 530 can be overlaid on graphic 520 and enable a user to control the playback of the media item. In some embodiments, the electronic device can provide an indication to a user whether or not a played back media item is a host-device recommended media item. For example, display 500 can include tag 522 identifying the media item as recommended. As another example, display 500 may only display options 524 and 526, described below, for recommended media items.

The user can indicate whether the user likes or dislikes the currently played back media item using any suitable approach, including for example by selecting up and down options 524 and 526, respectively. The electronic device can monitor the user's selections of options 524 and 526 to adjust the user's preference profile. In particular, the electronic device can change the data reflecting the user's likes and dislikes based on the characteristics of the media items that the user approves or disproves (e.g., using options 524 and 526). In some embodiments, the playback can also be controlled by options 524 and 526. For example, in response to a user selection of "down" option 526, the electronic device can skip playback to the next media item in the playback queue.

The electronic device can perform any suitable action in response to receiving a user selection of "up" option 524. In some embodiments, the electronic device can transfer the played back media item from the recommended items to the user-selected items (e.g., on the electronic device or on the host device). Alternatively or in addition, the electronic device can identify the media item for the host device such that the host device can recommend a collection associated with the media item (e.g., a cluster including the media item).

The electronic device can identify the played back media item using any suitable approach, including for example a particular metadata flag.

The electronic device can perform any suitable action in response to receiving a user selection of "down" option 526. In some embodiments, the electronic device can mark the media item such that it is automatically removed from the electronic device (e.g., immediately, when storage is later needed, or when the device is later re-connected to the host device). The media item can be marked such that no other media items from the user's library that are closely related to the media item (e.g., other media items in a common cluster) are recommended to the user. The electronic device can mark media items using any suitable approach, including for example using a metadata flag.

When the electronic device is later re-connected to the host device, the electronic device can provide feedback information describing the user's interactions with the device and feedback information for the media items (e.g., whether the user skipped a recommended track, and user selections of options 524 and 526 to the host device). The host device can review the received feedback information and revise the user's preference profile. In particular, the host device can revise the preference profile while placing more weight on the most recently added data (reflecting the user's most recent tastes). In some embodiments, the host device can also automatically move approved media items from the recommended portion of storage to the user-selected portion of storage. Because recently approved media items may be of most immediate interest to the user, the host device can provide new recommended media items based on the approved media items (e.g., select clusters or seed-based playlists using the approved media items as seeds).

To ensure that the host device does not recommend media items that are known to be of no interest to the user, the electronic device can similarly identify media items similar to rejected media items (e.g., clusters or seed-based playlists using the rejected media items), and ignore those media items for media recommendations.

Upon receiving the electronic device feedback, the host device can provide new recommended media items. Because the user may have accepted some previously recommended media items, the amount of storage remaining for new recommendations may decrease.

The host device can therefore provide fewer recommendations (e.g., automatically moving the slider of display 300, FIG. 3), or remove previously user-selected media items from storage to make room for new recommended media.

The host device, electronic device, or media library can determine which media items to remove using any suitable approach. In some embodiments, the host device can identify and remove the media items that least match the user's preference profile. For example, the host device can identify media items that are similar to rejected media items (e.g., media items in a cluster with a rejected media item). In some cases, the host device can instead or in addition select media items based on the most recently approved media items. For example, the electronic device can identify and remove the previously stored media items that are least like the newly approved media items (e.g., indicating a change in taste by the user). For example, the host device can remove previously stored media items that are not in a cluster with approved media items.

Alternatively or in addition, the host device can identify media items to remove based on playback attributes of the media items. For example, the host device can remove media items that have not been recently played back, or that have been played back only a few times. Alternatively, the host device can remove media items that have been played back recently, or that have been played back many times (e.g., so that the user can hear new music). As another example, the host device can remove media items that have low user ratings, or other metadata or attributes that indicate a lesser user interest.

In some embodiments, the host device can provide shorter clips of recommended media instead of the entire recommended media item. For example, the electronic device can transfer 30-second clips of music instead of entire songs. The clip can include any suitable portion of the song, including for example an arbitrary portion or a representative portion of the song (e.g., the end of a verse and the chorus). This may allow the electronic device to include a larger number of recommended media items, thus ensuring that the user can play back a larger user selected portion of the user's library. When the user later approves a recommended media clip, the entire corresponding media item can be loaded or transferred to the electronic device.

Other techniques can be used to increase the number of recommended media items stored by the electronic device. In some embodiments, the encoding used for recommended media items can be changed to take up less storage. For example, a lossy encoding can be used. As another example, a lower bit rate can be used for recommended media. When the user approves a recommended media item, the full media item can be loaded in electronic device storage (e.g., lossless encoding at the full bit rate).

Figure 6:
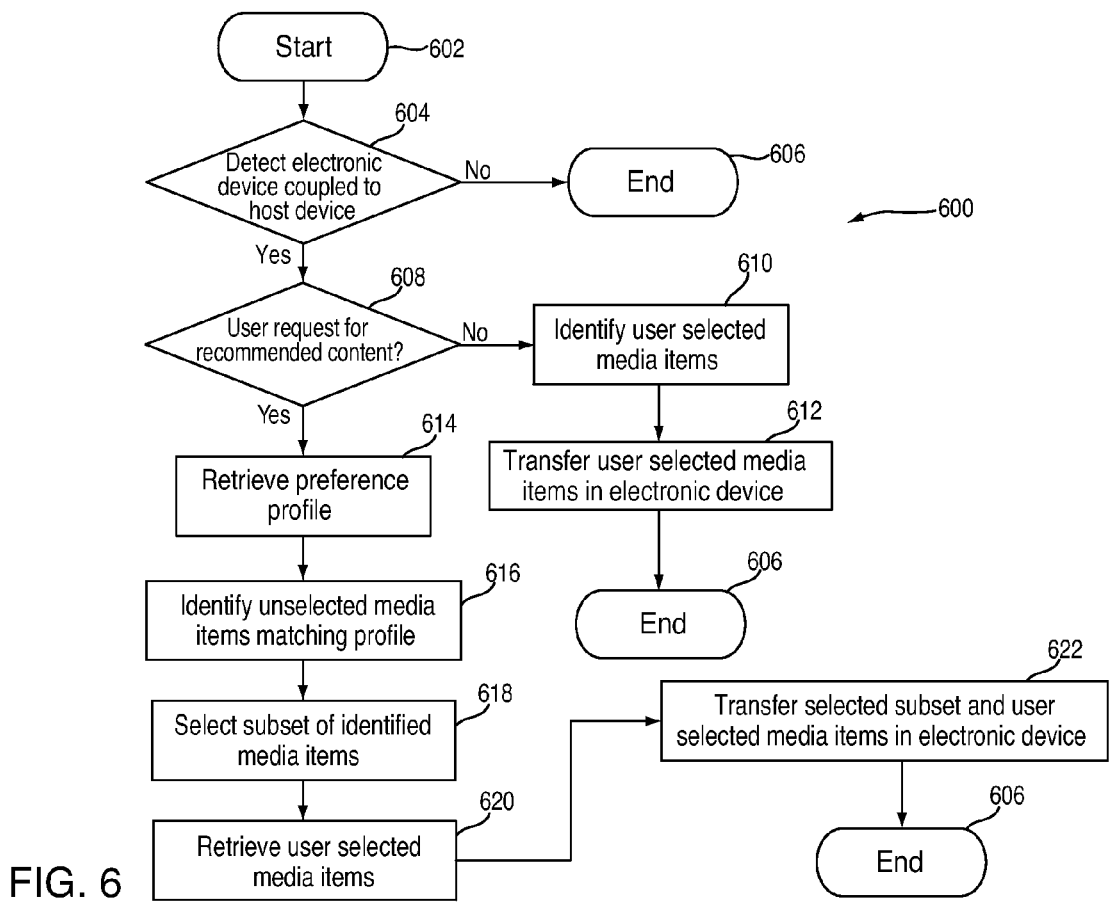
FIG. 6 is a flowchart of an illustrative process for identifying and transferring recommended media items to an electronic device in accordance with one embodiment of the invention.

FIG. 6 is a flowchart of an illustrative process for identifying and loading recommended media items on an electronic device in accordance with one embodiment of the invention. Process 600 can begin at step 602. At step 604, the host device can determine whether an electronic device has been coupled to the host device. For example, the host device can determine whether a particular signal associated with an electronic device coupled via a communications path has been detected. In some embodiments, other components of a communications or media system can detect whether an electronic device is coupled to another device having access to a media library. If the host device determines that no electronic device is coupled to the host device, process 600 can move to step 606 and end.

If, at step 604, the host device instead or in addition determines that an electronic device is coupled to a host device, process 600 can move to step 608. At step 608, the host device can determine whether the user of the electronic device has requested recommended content for the electronic device. For example, the host device can determine whether a setting associated with discovering content of a user's media library has been set. As another example, the host device can determine whether a particular amount of electronic device storage has been allocated to host device selected media items. If the host device determines that no request for recommended content has been provided, process 600 can move to step 610. At step 610, the host device can identify user selected media items to load in electronic device storage. For example, the host device can identify media items by particular artists, or in particular albums or playlists. At step 612, the host device can load the identified user selected media items in the electronic device storage. For example, the host device can load the available electronic device storage with media items satisfying the user defined selection criteria. Process 600 can then end at step 606.

If, at step 608, the host device instead determines that a user request for recommended content was provided, process 600 can move to step 614. At step 614, the host device can retrieve a preference profile associated with the user. The preference profile can include any suitable information defining a user's preferences. For example, the preference profile can define particular attributes associated with media items of interest to the user. The attributes can include metadata values associated with media items, identifying information for particular media items, characteristics of the media items (e.g., tonality of music), or any other information suitable for defining a user's media preferences. The preference profile can be retrieved from any suitable location, including for example the host device, electronic device, a cloud, or any other suitable source. At step 616, the host device can identify unselected media items matching the retrieved profile. For example, the host device can identify media items that were not specifically selected by the user for storage by the electronic device, and compare the media items with the preference profile. In particular, the host device can identify the unselected media items that match the preference profile.

At step 618, the host device can select a subset of the identified media items. For example, the host device can select a subset of the identified media items that matches the preference profile. As another example, the host device can select a subset of media items that are related or similar to the preference profile by at least a minimum or threshold amount. At step 620, the host device can retrieve user selected media items. For example, the host device can identify user selected media items to transfer to electronic device storage. In some embodiments, step 620 can include some or all of the features of step 610 described above. At step 622, the host device can transfer the selected subset of media items, as well as the user selected media items to the electronic device. For example, the host device can transfer both the user selected media items as well as the host device selected subset of media items. Process 600 can then move to step 606 and end.

Figure 7:
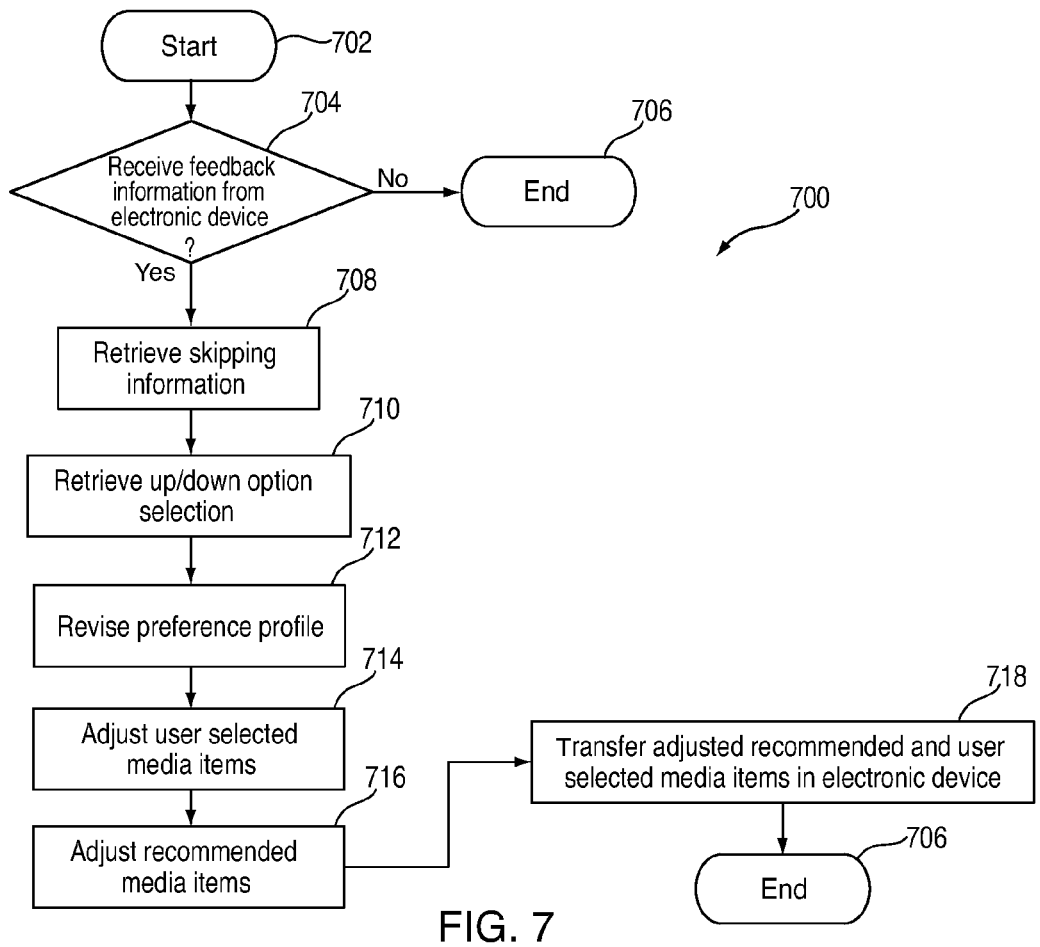
FIG. 7 is a flowchart of an illustrative process for revising recommended media items in accordance with one embodiment of the invention.

FIG. 7 is a flowchart of an illustrative process for revising recommended media items in accordance with one embodiment of the invention. Process 700 can begin at step 702. At step 704, the host device can determine whether feedback information has been received from the electronic device. For example, the host device can determine whether an electronic device is coupled to the host device and has provided feedback information as part of a synching process. If the host device determines that no feedback information has been received, process 700 can move to step 706 and end.

If, at step 704, the host device instead or in addition determines that feedback information has been received from an electronic device, process 700 can move to step 708. At step 708, the host device can retrieve skipping information from the electronic device. For example, the host device can determine which played back media items were skipped. As another example, the host device can determine the play counts for the played back media items. At step 710, the host device can retrieve up/down option selection information. For example, the host device can retrieve identifying information specifying which media items, when played back, were approved or rejected by the user (e.g., using up and down options overlaid on a now playing screen).

At step 712, the host device can revise the preference profile associated with the user. For example, the preference profile can be adjusted to revise the types of media items liked or disliked by the user. For example, the preference profile can be revised to weigh attributes related to the more recently played back media items higher than older media items. At step 714, the host device can adjust the user selected media items. For example, the host device can add played back recommended media items that the user approved to the listing of user selected media items. In some embodiments, the host device can instead or in addition remove other user selected media items from the listing of user selected media items (e.g., so that the amount of storage associated with the user selected media items remains constant). The host device can determine which media items to remove from the listing of user selected media items using any suitable approach, including for example based on the user's preference profile.

At step 716, the host device can adjust the media items recommended to the user. For example, the host device can revise the listing of recommended media items based on the revised preference profile. As another example, the host device can revise the recommended media items based on the retrieved feedback information of the device. At step 718, the host device can transfer the adjusted user selected media items and adjusted recommended media items to the electronic device. For example, the host device can transfer both adjusted sets of user selected media items as well as the host device selected subset of media items over a communications network. Process 700 can then move to step 706 and end.

FIG. 8 is a flowchart of an illustrative process for automatically transferring recommended items of a user's media library to an electronic device in accordance with one embodiment of the invention. Process 800 can begin at step 802. At step 804, a host device having access to the user's media library and connected to the electronic device can identify a first set of media items selected by the user to transfer to the device. For example, the host device can identify one or more playlists, genres, artists, or other collection of media items that a user has selected for storage on the device. At step 806, the host device can automatically select a subset of media items from the media library, where the media items of the subset are not part of the first set, and relate to the user's interests. For example, the host device can refer to a user's preference profile to determine the types of media items of the user's media library that the user may like. The host device can then select some or all of those media items. In some embodiments, the host device can instead or in addition select media items of the library that resemble or are related to media items of the user selected first set. At step 808, the host device can transfer the first set and the automatically selected subset of media items to the electronic device. For example, the host device can transfer the first set of media items, and the selected subset via a communications path between the host device and the electronic device. Process 800 can then end at step 810.

FIG. 9 is a flowchart of an illustrative process for selecting media items to recommend in accordance with one embodiment of the invention.

Process 900 can begin at step 902. At step 904, a host device can receive feedback information from previously recommended media items that were played back by the electronic device. For example, the host device can receive an indication of which recommended media items were played back or skipped, user rankings of the recommended media items, or other information related to the recommended media item playback. At step 906, the host device can adjust a preference profile based on the received feedback information. For example, the host device can modify the attributes or characteristics of media items known to be liked by the user in the preference profile.

At step 908, the host device can automatically select a new set of media items to recommend based on the user's preference profile. For example, the host device can refer to the revised preference profile to determine the types of media items of the user's media library that the user may like. The host device can then select some or all of those media items. At step 910, the host device can store the new set of recommended media items on the electronic device. For example, the host device can transfer the new set of media items to the electronic device over a dedicated cable. Process 900 can then end at step 912.

Figure 10:
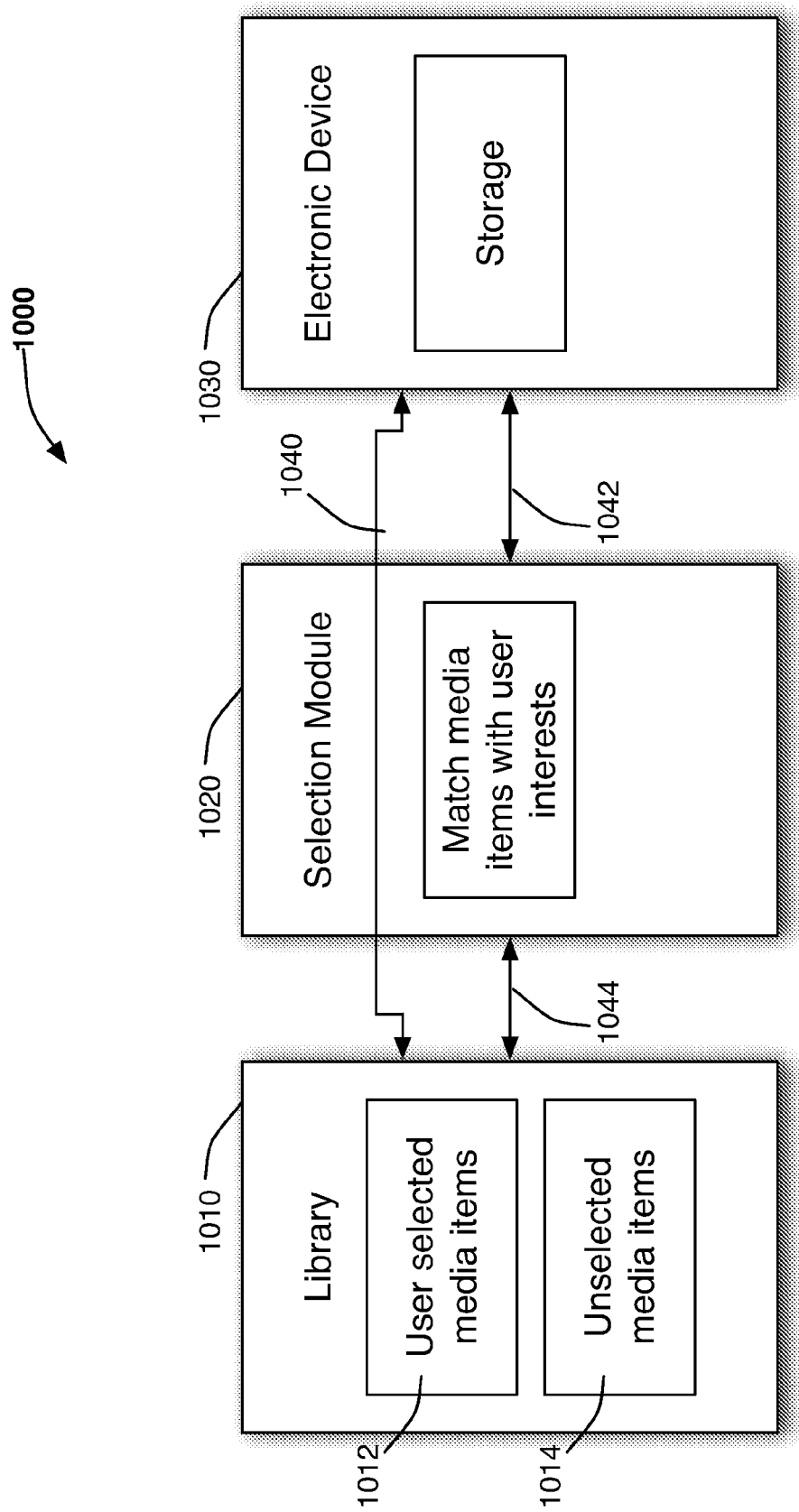
FIG. 10 is a schematic view of an illustrative system for recommending media items to a user in accordance with one embodiment of the invention.

FIG. 10 is a schematic view of an illustrative system for recommending media items to a user in accordance with one embodiment of the invention. System 1000 can include library 1010, selection module 1020, and electronic device 1030. Library 1010 can include a library of media items available for playback by a user. The library can include media items owned and stored by the user, media items to which the user has access (e.g., media items that a user can stream as part of a subscription), or combinations of these. The library can be stored on one or more devices, including for example a host device, a remote server, a cloud, or any other suitable device. The media items in the library can be classified in two or more groups or sets. For example, library 1010 can include user selected media items 1012 and unselected media items 1014. In some embodiments, library 1010 can include several sets of selected media items 1012 (e.g., as part of different playlists) such that the set of unselected media items 1014 depends on which set of selected media items 1012 is actually transferred to the electronic device (described below).

Selection module 1020 can include a module for selecting particular media items to recommend to a user. For example, selection module 1020 can be operative to review the media items available in library 1010 that are not part of set 1012 (e.g., set 1014), and select some or all of the unselected media items to recommended to the user. The resulting recommended media items can be transferred to the electronic device. Selection module 1020 can be incorporated in any suitable combination of hardware, firmware and software operating on one or more device or component of system 1000. In some embodiments, selection module 1020 can include a software application operating as part of the library, within an electronic device receiving media items (e.g., electronic device 1030), a host device, remote server, cloud, or any other component or device of system 1000. Selection module 1020 can determine which media items to recommend using any suitable approach, including for example based on a preference profile associated with a user that is accessed or stored by the module. In some embodiments, selection module 1020 can instead or in addition monitor for or receive feedback from one or more of library 1010 and electronic device 1030 describing the user's interests. Selection module 1020 can then determine the user's preferences from the feedback.

Electronic device 1030 can include any suitable device for playing back media items from library 1010. In some embodiments, electronic device 1030 can include some or all of the features of electronic device 100 (FIG. 1). In particular, electronic device 1030 can include storage 1032 for storing media items transferred from library 1010, as well as an input interface for controlling the electronic device, and a display and an audio output for playing back media items. Electronic device 1030 can receive media items from library 1010 over path 1040 (e.g., set 1012 of media items). In some embodiments, electronic device 1030 can provide feedback to library 1010 regarding the user's playback experience. Electronic device 1030 can instead or in addition receive media items from selection module 1020 over path 1042 (e.g., recommended media items selected from set 1014), and can provide feedback to selection module 1020. Selection module 1020 can determine which media items are available from library 1010, and select particular media items to recommend over path 1044. Each of paths 1040, 1042 and 1044 can be provided over any suitable communications network or protocol, including for example wired and wireless networks and protocols.

The different elements shown in system 1000 are merely illustrative, and it will be understood that each element can include additional components, and that particular shown elements can be combined or omitted. For example, selection module 1020 can be embedded within one or both of library 1010 and electronic device 1030.

Although many of the embodiments of the present invention are described herein with respect to personal computing devices, it should be understood that the present invention is not limited to personal computing applications, but is generally applicable to other applications.

Embodiments of the invention can be preferably implemented by software, but can also be implemented in hardware, firmware, software or a combination thereof. Embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for recommending media items to a user, comprising:
    generating a media library, associated with the user, including the media items, the media items being owned, at least in part, by the user;
    storing with an electronic device a first set of media items that is selected by the user for storage on the electronic device from a media library that is associated with the user;
    storing with the electronic device a second set of media items that is recommended for the user based on at least one interest of the user from the media library the second set including media items of the media library not chosen by the user for storage on the electronic device;
    playing back with the electronic device a first media item from the stored second set of media items;
    receiving with the electronic device user feedback regarding the played back first media item; and
    in response to the receiving, transferring with the electronic device an entirety of the played back first media item to the stored first set of media items from the stored second set of media items.

2. The method of claim 1, further comprising:
    providing with the electronic device the received user feedback to a host device to update a preference profile that is associated with the user.

3. The method of claim 1, wherein the storing the second set of media items comprises:
    determining an amount of electronic device storage that is associated with recommended media items, wherein a number of media items in the second set of media items is based on the determined amount of electronic device storage.

4. The method of claim 1, wherein:
the storing the first set of media items comprises storing the first set of media items in a first storage portion of the electronic device;
the storing the second set of media items comprises storing the second set of media items in a second storage portion of the electronic device; and
the transferring the first media item comprises moving the first media item from the second storage portion to the first storage portion.

5. The method of claim 3, wherein:
the determined amount that is associated with recommended media items comprises an amount of storage of the electronic device that is allocated to recommended media items.

6. The method of claim 1, wherein the received user feedback comprises:
an approval of the played back first media item.

7. The method of claim 1, wherein the receiving comprises:
receiving the user feedback during the playing back the first media item.

8. The method of claim 1, wherein:
the first media item comprises metadata; and
the transferring the first media item comprises modifying the metadata.

9. The method of claim 1, wherein the user feedback is at least one of whether the first media item was played back or skipped and a user ranking of the first media item.

10. An electronic device for storing media items for playback by a user, comprising control circuitry and storage, the control circuitry operative to:
generate a media library, associated with the user, including the media items, the media items being owned, at least in part, by the user;
allocate a first portion of the storage to user selected media items that are received from a media library;
allocate a second portion of the storage to recommended media items that are received from the media library the second set including media items of the media library not chosen by the user for storage on the electronic device;
play back at least one media item of the recommended media items from the second portion of the storage;
receive a user indication that corresponds to the played back at least one media item; and
in response to the received user indication, transfer an entirety of the at least one media item to the first portion of the storage from the second portion of the storage.

11. The electronic device of claim 10, wherein the control circuitry is further operative to:
provide the received user indication to a host device to update a preference profile of the user.

12. The electronic device of claim 11, wherein the received user indication comprises an approval of the played back at least one media item.

13. The electronic device of claim 10, wherein the control circuitry is further operative to:
prior to receiving the user indication, prompt the user to select one of an approval option and a disproval option for the played back at least one media item.

14. The electronic device of claim 10, wherein the control circuitry is further operative to:
receive the user indication during the playback of the at least one media item.

15. The electronic device of claim 10, wherein:
the at least one media item comprises metadata; and
the control circuitry is operative to transfer the at least one media item by modifying the metadata.

16. Non-transitory computer readable media for recommending media items to a user, the computer readable media comprising computer program logic recorded thereon for:
generating a media library, associated with the user, including the media items, the media items being owned, at least in part, by the user;
storing with an electronic device a first set of media items that is selected by the user for storage on the electronic device from a media library that is associated with the user;
storing with the electronic a second set of media items that is recommended for the user based on at least one interest of the user from the media library the second set including media items of the media library not chosen by the user for storage on the electronic device;
playing back with the electronic device a first media item from the stored second set of media items;
receiving with the electronic device initial user feedback regarding the played back first media item; and
in response to the receiving the initial user feedback, transferring with the electronic device an entirety of the first media item to the stored first set of media items from the stored second set of media items.

17. The non-transitory computer readable media of claim 16, wherein:
the storing the second set of media items comprises determining an amount of electronic device storage that is associated with recommended media items; and
a number of media items in the second set of media items is based on the determined amount of electronic device storage.

18. The non-transitory computer readable media of claim 17, wherein the determined amount that is associated with recommended media items comprises an amount of storage of the electronic device that is allocated to recommended media items.

19. The non-transitory computer readable media of claim 16, wherein:
the first set of media items is stored in a first storage portion of the electronic device;
the second set of media items is stored in a second storage portion of the electronic device; and
the transferring the first media item comprises moving the first media item from the second storage portion to the first storage portion.

20. The non-transitory computer readable media of claim 16, wherein:
the first media item comprises metadata; and
the transferring the first media item comprises modifying the metadata.

* * * * *

UNITED STATES PATENT AND TRADEMARK OFFICE
CERTIFICATE OF CORRECTION

PATENT NO. : 8,732,180 B2  Page 1 of 1
APPLICATION NO. : 12/617338
DATED : May 20, 2014
INVENTOR(S) : Lindahl et al.

It is certified that error appears in the above-identified patent and that said Letters Patent is hereby corrected as shown below:

In the Claims:

In column 16, line 49, in Claim 1, after "library", insert --,--, therefor

In column 17, line 42, in Claim 10, after "library", insert --,--, therefor

In column 18, line 21, in Claim 16, after "electronic", insert --device--, therefor In column 18, line 23, in Claim 16, after "library", insert --,--, therefor Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,732,180 B2 | Page 1 of 1 |
| APPLICATION NO. | : 12/617338 | |
| DATED | : May 20, 2014 | |
| INVENTOR(S) | : Lindahl et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this
Eleventh Day of August, 2015

Michelle K. Lee
*Director of the United States Patent and Trademark Office*